(12) United States Patent
Kenkel

(10) Patent No.: US 9,651,149 B2
(45) Date of Patent: May 16, 2017

(54) OPEN CENTER HYDRAULIC FLUSHING SYSTEM AND METHOD

(71) Applicant: Deere & Company, Moline, IL (US)

(72) Inventor: Aaron R. Kenkel, Sioux City, IA (US)

(73) Assignee: DEERE & COMPANY, Moline, IL (US)

( * ) Notice: Subject to any disclaimer, the term of this patent is extended or adjusted under 35 U.S.C. 154(b) by 93 days.

(21) Appl. No.: 14/556,267

(22) Filed: Dec. 1, 2014

(65) Prior Publication Data
US 2016/0153556 A1    Jun. 2, 2016

(51) Int. Cl.
*F16H 61/4104*    (2010.01)
*F16K 11/06*    (2006.01)
(Continued)

(52) U.S. Cl.
CPC .......... *F16H 61/4104* (2013.01); *F16K 11/06* (2013.01); *F16K 27/04* (2013.01); *B60K 2023/0866* (2013.01); *B60R 16/08* (2013.01); *B60Y 2200/411* (2013.01); *E02F 9/226* (2013.01); *E02F 9/2289* (2013.01); *F15B 13/0402* (2013.01); *F16K 11/07* (2013.01); *F16K 27/041* (2013.01);
(Continued)

(58) Field of Classification Search
CPC .......... F16K 11/06; F16K 11/07; F16K 27/04; F16K 27/041; F16K 31/0613; F15B 13/0402; B60R 16/08; F16H 61/4104; Y10T 137/86622; Y10T 137/86694; Y10T 137/8671; Y10T 137/8667; B60Y 2200/411; B60K 2023/0866; E02F 9/226; E02F 9/2289

USPC ...... 137/625.65, 625.25, 625.67, 625.69, 10, 137/625.48, 625.45, 625.49, 625.4
See application file for complete search history.

(56) References Cited

U.S. PATENT DOCUMENTS 3,426,799 A * 2/1969 Kintner ................... F16K 3/243
                                                  137/625.48
4,655,253 A * 4/1987 Ourensma ............... F16K 1/446
                                                  137/240

(Continued)

OTHER PUBLICATIONS

Any definition; printed Oct. 13, 2016.*
Regardless of definition; printed Oct. 13, 2016.*

*Primary Examiner* — R.K. Arundale
*Assistant Examiner* — Kelsey Rohman
(74) *Attorney, Agent, or Firm* — Taft Stettinius & Hollister LLP; Stephen F. Rost

(57) ABSTRACT

An open center flushing valve for a hydraulic system including a hydraulic circuit and a fluid flushing system, where the flushing valve has multiple positions that each include a fluid exhaust path through the flushing valve. Any of the flushing valve positions couples the hydraulic circuit to the fluid flushing system through a fluid exhaust path for that position. The flushing valve can include unpowered and powered positions. The hydraulic circuit can have two sides separately coupled to the flushing valve where in a powered position, only one side of the hydraulic circuit is coupled to the fluid flushing system through the flushing valve, and in an unpowered position both sides of the hydraulic circuit are coupled to the fluid flushing system through the flushing valve. In a powered position, the lower pressure side of the hydraulic circuit can be coupled to the fluid flushing system through the flushing valve.

17 Claims, 5 Drawing Sheets

(51) Int. Cl.
*F16K 27/04* (2006.01)
*F16K 11/07* (2006.01)
*F16K 31/06* (2006.01)
*B60R 16/08* (2006.01)
*F15B 13/04* (2006.01)
*B60K 23/08* (2006.01)
*E02F 9/22* (2006.01)

(52) U.S. Cl.
CPC ..... *F16K 31/0613* (2013.01); *Y10T 137/8667* (2015.04); *Y10T 137/8671* (2015.04); *Y10T 137/86622* (2015.04); *Y10T 137/86694* (2015.04)

(56) References Cited

U.S. PATENT DOCUMENTS

2010/0032036 A1* 2/2010 Quendt ................. F16K 11/044
 137/625.4
2011/0011783 A1* 1/2011 Lippert ............... F16K 31/0603
 210/232

* cited by examiner

OPEN CENTER HYDRAULIC FLUSHING SYSTEM AND METHOD

FIELD OF THE DISCLOSURE

The present disclosure relates to hydraulic circuits and more particularly to a means to exhaust flow from a hydraulic circuit that is operating in a non-powered (static) condition.

BACKGROUND

In a closed loop hydraulic or hydrostatic circuit, flow is exhausted from the working circuit for the purposes of cooling and filtering. If this is the only system contributing to a particular work function (a hydrostatic drive, for example), exhausting this oil only during powered operation is generally acceptable. If the system is assisted or provides assistance to another system (a part time hydrostatic drive on a machine that is primarily driven by a traditional transmission, for example) a means of exhausting oil in a non-powered (standby) condition may be necessary.

Previous efforts include splitting the traditional hydrostatic flushing system between two separate devices. For example, a motor grader vehicle can include a hydrostatic loop flushing system that is independent from the drive motor case flushing system. Typical hydrostatic loop flushing exhausts flow from the low pressure side of the work circuit prior to sending it to the hydraulic oil cooler and reservoir. A separate system utilizes a small pump to send constant flow to the cases of the drive motors. This provides benefits similar to an open center loop flushing system, but does so by utilizing extra components and hydraulic circuits which add costs and complexity.

It would be desirable to have a hydrostatic loop flushing system that always flushes fluid through the system whether the hydrostatic circuit is in a powered or unpowered state.

SUMMARY

An open center flushing valve is disclosed for use in a hydraulic system that includes a hydraulic circuit and a fluid flushing system. The open center flushing valve includes a spool, first and second work ports and an outlet port. The spool is located in the interior of the flushing valve, and is movable between a plurality of spool positions. The first work port hydraulically couples the flushing valve to a first side of the hydraulic circuit, the second work port hydraulically couples the flushing valve to a second side of the hydraulic circuit, and the outlet port hydraulically couples the flushing valve to the fluid flushing system. When the spool is in a first spool position, it allows flow between the first work port and the outlet port and blocks flow between the second work port and the outlet port. When the spool is in a second spool position, it allows flow between the first work port and the outlet port and blocks flow between the second work port and the outlet port. When the spool is in a third spool position, it allows flow between the first work port and the outlet port and also allows flow between the second work port and the outlet port.

The open center flushing valve can also include a power mechanism for moving the spool between the plurality of spool positions, where the power mechanism has an unpowered state and a plurality of powered states. In the unpowered state, the power mechanism does not provide an external force on the spool and the spool rests in the third position. In a first powered state, the power mechanism forces the spool into the first spool position, and in a second powered state, the power mechanism forces the spool into the second spool position.

The spool can include a first end portion, a middle portion and a second end portion, where the middle portion is located between the first and second end portions. In the first powered state, the power mechanism can force the spool into the first spool position where the first end portion of the spool blocks flow between the first work port and the outlet port and the middle portion of the spool allows flow between the second work port and the outlet port. In the second powered state, the power mechanism can force the spool into the second spool position where the second end portion of the spool blocks flow between the second work port and the outlet port and the middle portion of the spool allows flow between the first work port and the outlet port. In the unpowered state, the spool can rest in the third position where the middle portion of the spool allows flow between the first work port, the second work port and the outlet port. The first and second end portions of the spool can have a greater diameter than the middle portion of the spool.

The open center flushing valve can also include an interior cavity, where the spool is located in the interior cavity, and the first and second work ports and the outlet port are connected to the interior cavity. The length of the middle portion of the spool can be greater than the distance between the connections of the first and second work ports to the interior cavity. The interior cavity can have a first cavity diameter where the first work port connects to the interior cavity and a second cavity diameter where second work port connects to the interior cavity. The first end portion of the spool can have a first spool diameter that is substantially equal to the first cavity diameter, and the second end portion of the spool can have a second spool diameter that is substantially equal to the second cavity diameter. The first and second end portions of the spool can have a greater diameter than the middle portion of the spool. The interior cavity can have a substantially uniform diameter where the first cavity diameter is substantially equal to the second cavity diameter.

An open center flushing valve is disclosed for use in a hydraulic system that includes a hydraulic circuit and a fluid flushing system. The open center flushing valve includes a plurality of positions where each of the plurality of positions has a fluid exhaust flow path through the flushing valve. When the flushing valve is in the hydraulic system, any particular position of the plurality of positions of the flushing valve couples the hydraulic circuit to the fluid flushing system through the fluid exhaust flow path for that particular position. The plurality of positions can include an unpowered position and at least one powered position, where the flushing valve remains in the unpowered position except when the hydraulic circuit pressurizes the flushing valve which shifts the flushing valve into a powered position.

First and second sides of the hydraulic circuit can be separately coupled to the flushing valve, such that in any powered position only one of the first and second sides of the hydraulic circuit is coupled to the fluid flushing system through the flushing valve, and in the unpowered position both of the first and second sides of the hydraulic circuit are coupled to the fluid flushing system through the flushing valve. In any powered position, the lower pressure side of the hydraulic circuit can be coupled to the fluid flushing system through the flushing valve.

First and second sides of the hydraulic circuit can be separately coupled to the flushing valve such that when the first side of the hydraulic circuit is pressurized the flushing valve shifts to a first powered position with a first fluid exhaust flow path through the flushing valve coupling the hydraulic circuit to the fluid flushing system; when the second side of the hydraulic circuit is pressurized the flushing valve shifts to a second powered position with a second fluid exhaust flow path through the flushing valve coupling the hydraulic circuit to the fluid flushing system; and when neither the first or second sides of the hydraulic circuit are pressurized the flushing valve remains in the unpowered position with a third fluid exhaust flow path through the flushing valve coupling the hydraulic circuit to the fluid flushing system. In the first powered position, the first fluid exhaust flow path can couple the second side of the hydraulic circuit to the fluid flushing system. In the second powered position, the second fluid exhaust flow path can couple the first side of the hydraulic circuit to the fluid flushing system. In the unpowered position, the third fluid exhaust flow path can couple both the first and second sides of the hydraulic circuit to the fluid flushing system.

A hydraulic system flushing method is disclosed that includes coupling a hydraulic circuit to a fluid flushing system through an open center flushing valve having a plurality of positions; selectively pressurizing the flushing valve using pressure from the hydraulic circuit to shift the flushing valve between the plurality of positions; and regardless of the position of the flushing valve, coupling the hydraulic circuit to the fluid flushing system via a fluid exhaust flow path through the flushing valve. The plurality of positions of the flushing valve can include an unpowered position and at least one powered position, and the method can also include shifting the flushing valve to one of the at least one powered position when the hydraulic circuit pressurizes the flushing valve; and otherwise maintaining the flushing valve in the unpowered position. First and second sides of the hydraulic circuit can be separately coupled to the flushing valve, and the method can also include in any powered position, coupling only one of the first and second sides of the hydraulic circuit to the fluid flushing system through the flushing valve; and in the unpowered position, coupling both of the first and second sides of the hydraulic circuit to the fluid flushing system through the flushing valve. The method can also include, when the first side of the hydraulic circuit is pressurized relative to the second side, shifting the flushing valve to a first powered position with a first fluid exhaust flow path through the flushing valve coupling the hydraulic circuit to the fluid flushing system; when the second side of the hydraulic circuit is pressurized relative to the first side of the hydraulic circuit, shifting the flushing valve to a second powered position with a second fluid exhaust flow path through the flushing valve coupling the hydraulic circuit to the fluid flushing system; and when neither the first or second sides of the hydraulic circuit are pressurized relative to one another, maintaining the flushing valve in the unpowered position with a third fluid exhaust flow path through the flushing valve coupling the hydraulic circuit to the fluid flushing system. The method can also include, in the first powered position, coupling the second side of the hydraulic circuit to the fluid flushing system via the first flow path; in the second powered position, coupling the first side of the hydraulic circuit to the fluid flushing system via the second flow path; and in the unpowered position, coupling both the first and second sides of the hydraulic circuit to the fluid flushing system via the third flow path.

The above and other features will become apparent from the following description and the attached drawings.

BRIEF DESCRIPTION OF THE DRAWINGS

The detailed description of the drawing refers to the accompanying figures in which.

DETAILED DESCRIPTION

Figure 1:
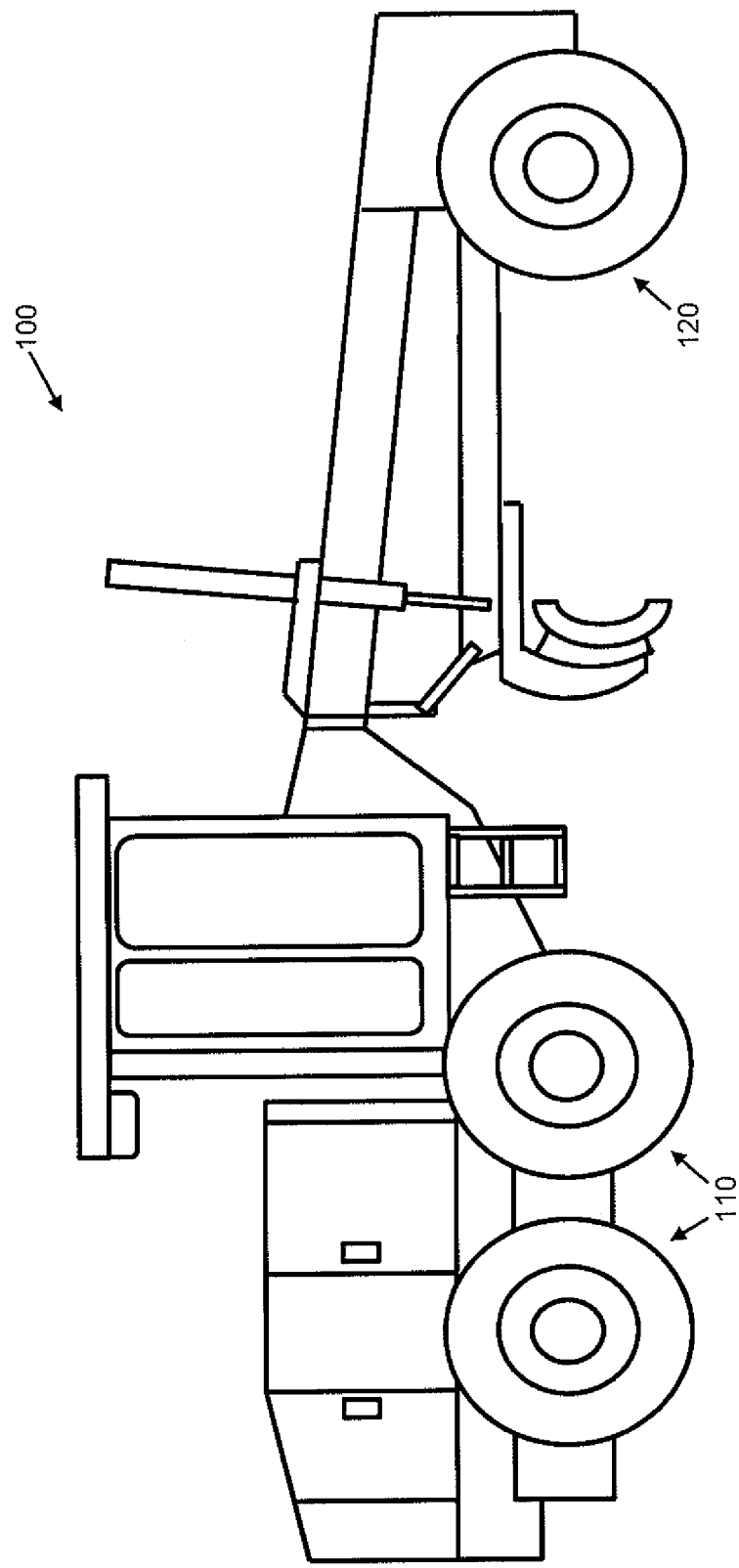
FIG. 1 illustrates an exemplary motor grader including six wheels that are powered by two independent drive systems.

FIG. 1 illustrates an exemplary motor grader 100 which includes six wheels that are powered by two independent drive systems. The four rear wheels 110 are operated in tandem by a transmission that is driven directly by the machines engine. The front two wheels 120 are driven independently by two separate closed loop hydrostatic systems. The drive motors contained within this system are connected to a final drive hub that contains a clutch. When the clutch is engaged, the motors are tied to the wheels. When the clutch is disengaged, the wheels are allowed to spin freely. When engaged, the front wheel speeds are typically controlled to match the speeds of the rear wheels. When set to an "overly-aggressive" condition, the front wheel speeds are set higher than the rear wheel speeds (thus leading to more front wheel pull effort). When set to an "under-aggressive" condition, the front wheel speeds are set lower than the rear wheel speeds (thus causing the front wheels to pull only when the rear wheels are slipping). With a closed-center hydrostatic loop flushing circuit, when the hydrostatic systems driving the front wheels 120 are in an unpowered state (for example, when the rear wheels 110 are moving the motor grader 100) then there will not be any flushing of the front wheel hydrostatic systems.

A typical closed-loop hydraulic or hydrostatic system requires a means by which to flush fluid out of the closed circuit. This is typically accomplished through the use of a shuttle valve or spool. The pressure differential in the working circuit shifts the shuttle valve in such a way that the low pressure side of the hydrostatic loop is connected to a circuit intended to relieve flow (through the use of an orifice and/or pressure relief valve). Flow can be replenished in the circuit through an element aimed at maintaining a specific pressure in the low pressure side of the closed loop. The exhausted flow can then be directed to the case of one of the major hydraulic components (for example, the drive motor) and ultimately routed to the machine oil cooler. This process allows the oil to carry heat away from the hydraulic component that it is routed through. The replenishing flow can be filtered prior to being reintroduced into the closed loop circuit.

This type of circuit requires a pressure differential to shift the shuttle spool. In certain hydrostatic systems, there can be operating conditions when a pressure differential is not present while circuit cooling is still necessary. One example of this is the hydrostatic drive assist system for the front wheels 120 of the motor grader 100 with the traditional primary drive transmission for the rear wheels 110. Under certain conditions, the hydrostatic drive might be engaged but set in such a manner that it only provides power to the ground under low tractive conditions (the "under-aggressive" condition). Under this condition, the hydrostatic motors may still be connected to the ground and spinning in a non-powered manner. There would not be adequate pressure to shift the loop flushing shuttle spool, thus leading to a lack of cooling flow.

The typical loop flushing circuit can also have performance issues in cold weather. In cold weather conditions, when the system is sitting idle the flow through this circuit will remain stagnant. This allows for the oil to cool down (or remain cool) prior to the system being operated. When the system is then used, the cooled oil in the circuit can lead to an excessive amount of restriction, which can lead to the over-pressurization of any area through which this flushing oil flows (a drive motor case, for example). This over-pressurization can cause damage to system components. This can affect any type of hydrostatic system, but it especially affects part-time systems that can spend considerable amounts of time de-activated.

FIG. 2 illustrates an exemplary closed-center flushing valve 200 with an A-side and a B-side. The closed-center flushing valve 200 is part of a closed loop hydraulic or hydrostatic circuit where the A-side and B-side are part of the closed loop. The hydrostatic system also includes a pressure relief valve 210. The pressure relief valve in this and other embodiments could be replaced by an orifice or other method for flushing flow that are known to those of skill in the art. The pressure differential between the A-side and B-side of the closed loop hydrostatic circuit shifts the flushing valve 200 in such a way that the low pressure side of the hydrostatic loop is connected to the pressure relief valve 210.

Figure 2A:
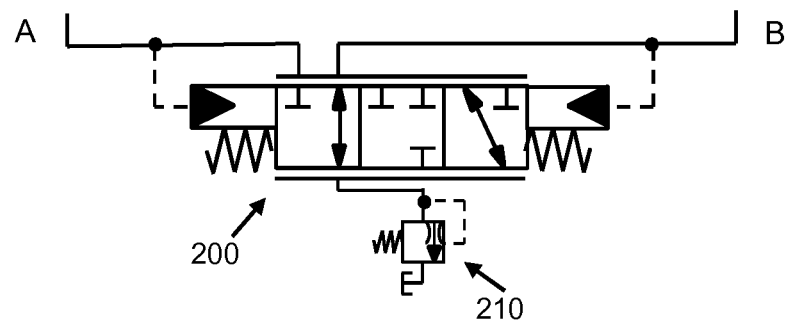
FIG. 2A illustrates an exemplary closed-center valve in a hydrostatic system with an A-side and a B-side where the A-side is the high-pressure side.
Figure 2B:
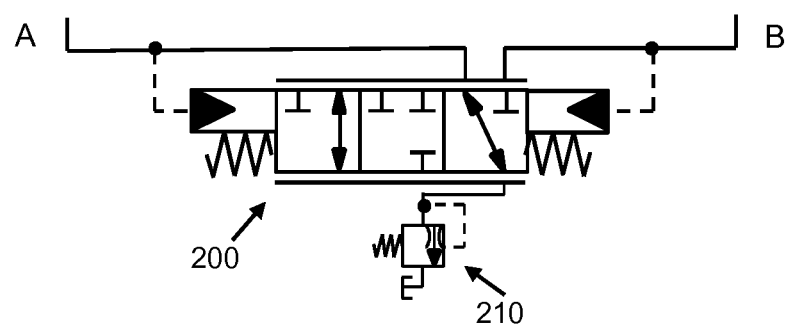
FIG. 2B illustrates the exemplary closed-center valve of FIG. 2A where the B-side is the high-pressure side.
Figure 2C:
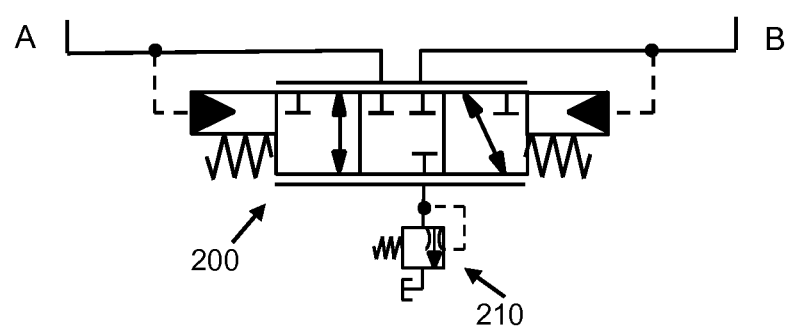
FIG. 2C illustrates the exemplary closed-center valve of FIG. 2A in the neutral position.

FIG. 2A shows the case where the A-side is pressurized, which shifts the flushing valve 200 to the right, which allows the flushing of fluid from the low-pressure B-side through the flushing valve 200 and into the pressure relief valve 210. FIG. 2B shows the case where the B-side is pressurized, which shifts the flushing valve 200 to the left, which allows the flushing of fluid from the low-pressure A-side through the flushing valve 200 and into the pressure relief valve 210. FIG. 2C shows the neutral case where the A-side and B-side are at substantially the same pressure, leaving the flushing valve 200 in the center position, which does not allow the flushing of fluid through the flushing valve 200.

FIG. 3 illustrates an exemplary open-center flushing valve 300 with an A-side and a B-side. The open-center flushing valve 300 is part of a closed loop hydraulic or hydrostatic circuit where the A-side and B-side are part of the closed loop. The hydrostatic system also includes a pressure relief valve 310. The pressure differential in the A-side and B-side of the closed loop hydrostatic circuit shifts the flushing valve 300 in such a way that the low pressure side of the hydrostatic loop is connected to the pressure relief valve 310. In addition; when the pressures are substantially equal in the A-side and B-side of the closed loop hydrostatic circuit, the flushing valve 300 allows flow from both sides of the hydrostatic loop to the pressure relief valve 310.

Figure 3A:
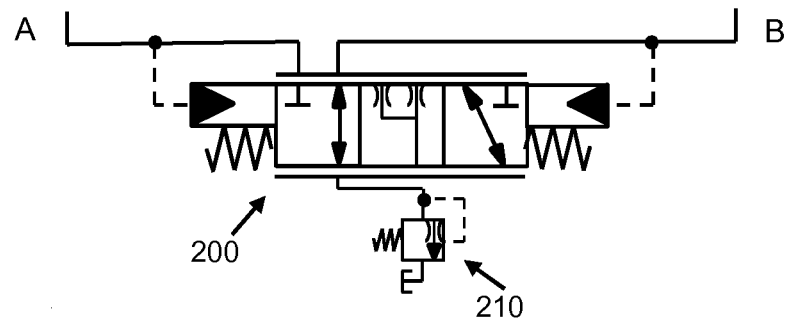
FIG. 3A illustrates an exemplary open-center valve in a hydrostatic system with an A-side and a B-side where the A-side is the high-pressure side.
Figure 3B:
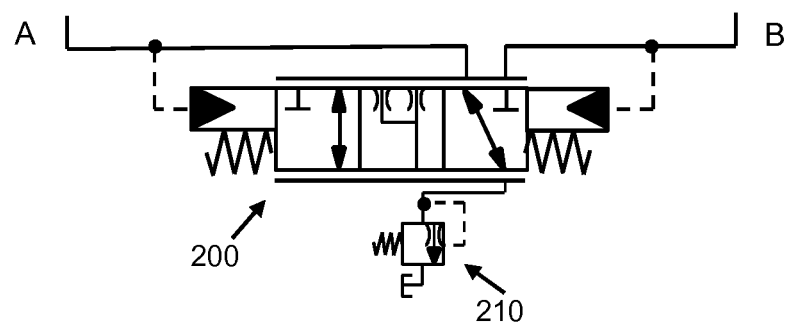
FIG. 3B illustrates the exemplary open-center valve of FIG. 3A where the B-side is the high-pressure side.
Figure 3C:
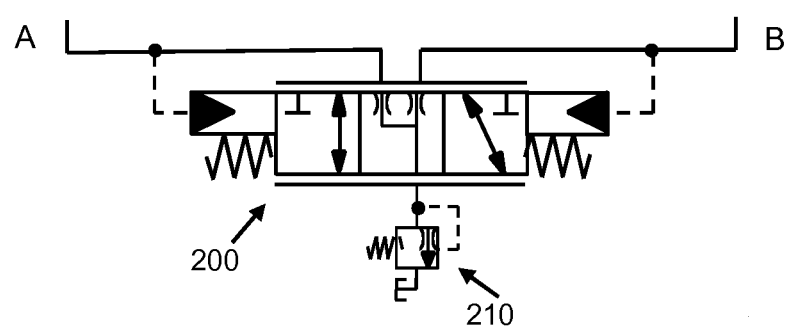
FIG. 3C illustrates the exemplary open-center valve of FIG. 3A in the neutral position.

FIG. 3A shows the case where the A-side is pressurized, which shifts the flushing valve 300 to the right, which allows the flushing of fluid from the low-pressure B-side through the flushing valve 300 and into the pressure relief valve 310. FIG. 3B shows the case where the B-side is pressurized, which shifts the flushing valve 300 to the left, which allows the flushing of fluid from the low-pressure A-side through the flushing valve 300 and into the pressure relief valve 310. FIG. 3C shows the neutral case where the A-side and B-side are at substantially the same pressure, leaving the flushing valve 300 in the center position, which allows the flushing of fluid from both the A-side and B-side through the flushing valve 300 and into the pressure relief valve 310.

Thus, in a powered condition, when higher pressure on one side shifts the valve, both the open-center and closed-center flushing valves allow flow from the low-pressure side of the hydrostatic loop. However, in an unpowered condition, when pressure is substantially equal on both sides of the valve, the open-center valve enables flushing from both sides of the hydrostatic loop, while the closed-center valve stops flow in the hydrostatic loop. Thus, there is always flow bleeding through the open-center valve whether the hydrostatic circuit is powered or unpowered.

The downstream valve 210 in FIGS. 2A-2C and 310 in FIGS. 3A-3C can be used to regulate the amount of flow that can be exhausted from the circuit in a powered condition. This type of downstream valve can be used in both a closed-center and open-center configuration to prevent the flushing of an excessive amount of flow from the circuit. FIGS. 2 and 3 illustrate the downstream valve as relief valve 210, 310, respectively, but it can be implemented in a number of different ways. The relief valve 210, 310 requires enough pressure to overcome a spring force before it will open and relieve flow. Alternative implementations can include, for example, an orifice valve or a spring loaded check valve. Depending upon the system design, it may also be possible to implement this function without an added valve.

Figure 4A:
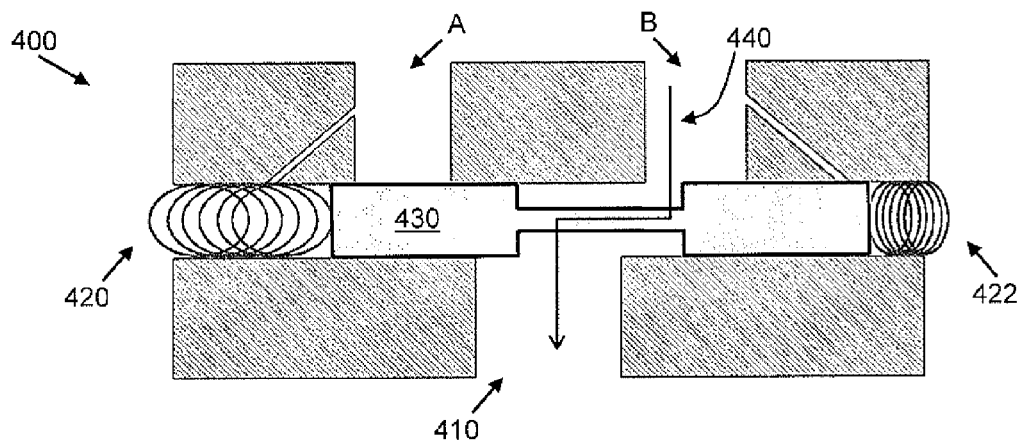
FIG. 4A illustrates an exemplary embodiment of a closed-center valve including two work ports and an outlet port where the A-side is pressurized (powered)
Figure 4B:
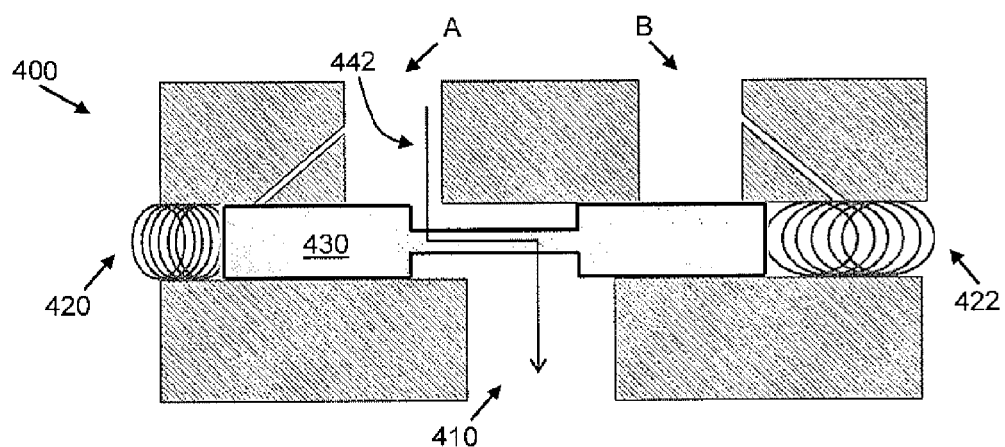
FIG. 4B illustrates the exemplary embodiment of the closed-center valve of FIG. 4A where the B-side is pressurized (powered)
Figure 4C:
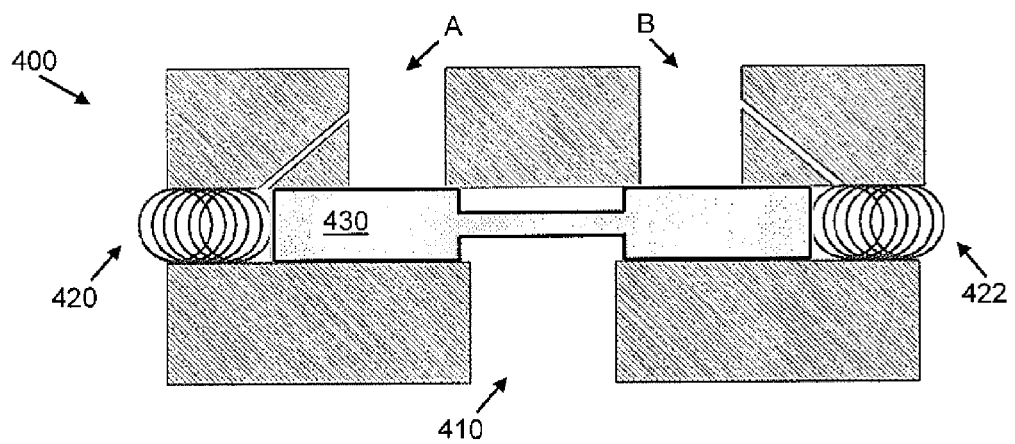
FIG. 4C illustrates the exemplary embodiment of the closed-center valve of FIG. 4A in the neutral position.

FIG. 4 illustrates an exemplary embodiment of a closed-center valve 400. The closed-center valve 400 includes work ports A and B, an outlet port 410, a first spring 420, a second spring 422 and a spool 430. The first and second springs 420, 422 bias the spool 430 to a neutral position in the center of the valve cavity (see FIG. 4C) when there is no other external forces acting on the spool 430. The spool 430 of the closed-center valve 400 is designed to prevent flow from both of the work ports A and B to the outlet port 410 when the spool 430 is in the center (neutral) position. When one of the work ports A or B are pressurized (a powered condition), the pressure forces the spool 430 to shift towards the non-pressurized (non-powered) work port. Notches can be cut into the spool 430 or other mechanisms used in the closed-center valve 400 to provide a flow path connecting the non-powered work port A or B to the outlet port 410, thus allowing flow to be flushed from the circuit through the non-pressurized (non-powered) work port.

FIG. 4A illustrates a state when the A-side of the closed-center valve 400 is powered. In this state, the spool 430 is pushed away from the A-side which compresses the second spring 422, blocks the work port A, and opens up a flow path indicated by arrow 440 from the work port B to the outlet port 410.

FIG. 4B illustrates a state when the B-side of the closed-center valve 400 is powered. In this state, the spool 430 is pushed away from the B-side which compresses the first spring 420, blocks the work port B, and opens up a flow path indicated by arrow 442 from the work port A to the outlet port 410.

FIG. 4C illustrates a neutral state when neither the A nor B-sides of the closed-center valve 400 are powered. In this state, the first and second springs 420, 422 bias the spool 430 to the center of the valve cavity where the spool 430 blocks flow from both the work ports A and B to the outlet port 410.

Figure 5A:
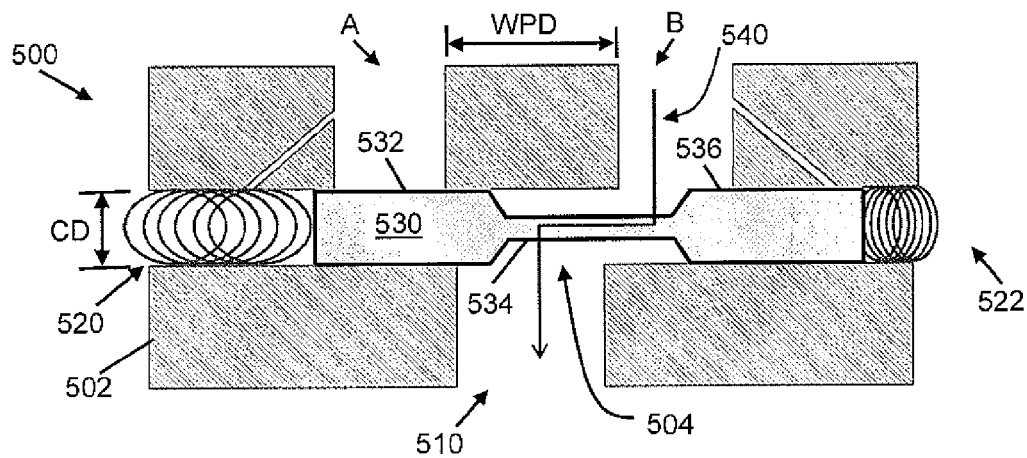
FIG. 5A illustrates an exemplary embodiment of an open-center valve including two work ports and an outlet port where the A-side is pressurized (powered)
Figure 5B:
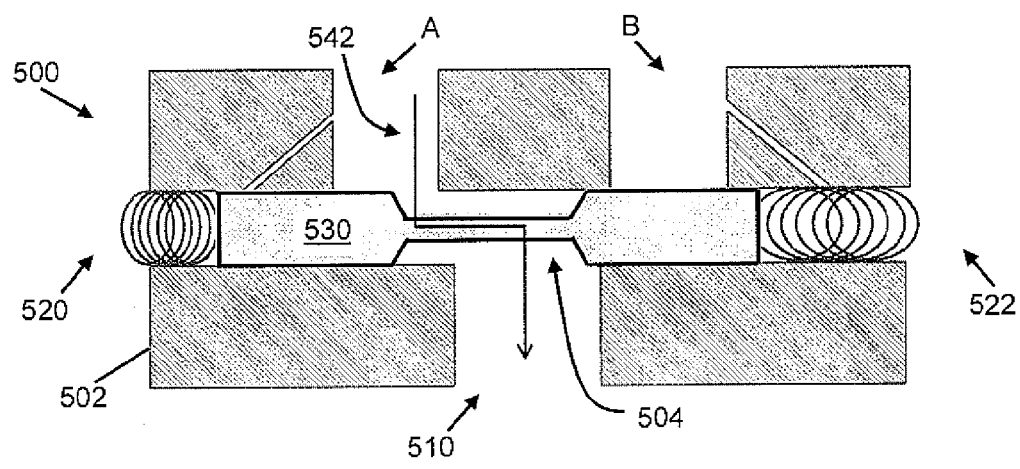
FIG. 5B illustrates the exemplary embodiment of the open-center valve of FIG. 5A where the B-side is pressurized (powered)
Figure 5C:
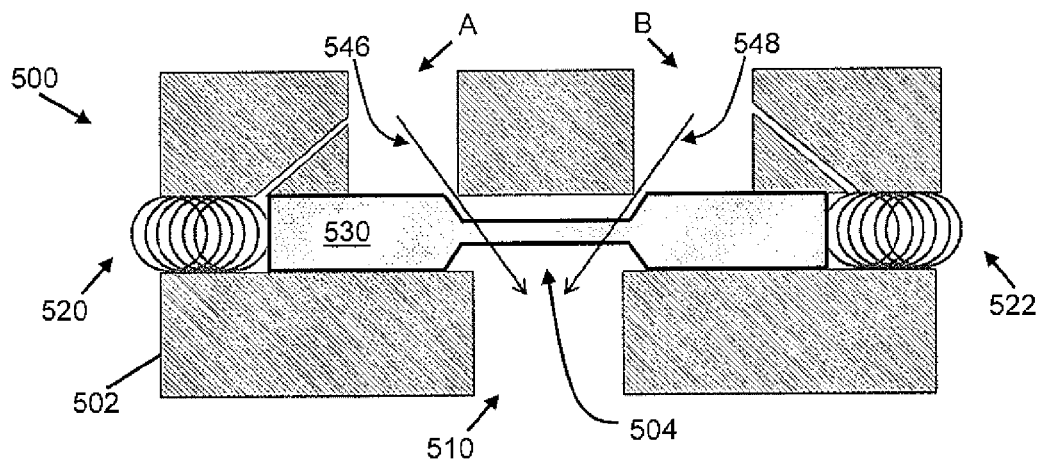
FIG. 5C illustrates the exemplary embodiment of the open-center valve of FIG. 5A in the neutral position.

FIG. 5 illustrates an exemplary embodiment of an open-center valve 500. The open-center valve 500 includes a valve body 502, an interior cavity 504, work ports A and B, an outlet port 510, a first spring 520, a second spring 522 and a spool 530. The work ports A and B, and the outlet port 510 connect the exterior of the valve body 502 to the interior cavity 504, and the spool 530 is located in the interior cavity 504. The first and second springs 520, 522 are part of a power mechanism that biases the spool 530 to a neutral position in the center of the valve cavity (see FIG. 5C) when there are no other external forces acting on the spool 530, and moves the spool 530 when power or pressure acts on the spool 530.

In this exemplary open-center valve 500, the spool 530 includes a first end portion 532, a second end portion 536 and a middle portion 534 between the first and second end portions 532, 536; and the interior cavity 504 has a substantially uniform cavity diameter CD. The outside diameter of the first and second end portions 532, 536 of the spool 530 is substantially equal to inside diameter CD of the interior cavity 504, and the outside diameter of the middle portion 534 of the spool 530 has a smaller outside diameter than the end portions 532, 536. The spool 530 of the open-center valve 500 is designed to allow flow from both of the work ports A and B to the outlet port 510 when the spool 530 is in the center (neutral) position. An exemplary way to achieve this, as shown in FIG. 5, is to make the length of the middle portion 534 of the spool 530 longer than the distance WPD between the work ports A and B. When one of the work ports A or B are pressurized (a powered condition), the pressure forces the spool 530 to shift towards the non-pressurized (non-powered) work port which blocks the pressurized (powered) work port with one of the first and second end portions 532, 536 of the spool 530 and opens a flow path around the middle portion 534 of the spool 530 between the non-pressurized (non-powered) work port and the outlet port 510. Notches can be cut into the middle portion 534 of the spool 530 or other mechanisms used in the open-center valve 500 to provide a flow path connecting the non-powered work port A or B to the outlet port 510, thus allowing flow to be flushed from the circuit through the non-pressurized (non-powered) work port.

FIG. 5A illustrates a powered state when the A-side of the open-center valve 500 is powered. In this state, the spool 530 is pushed away from the A-side which compresses the second spring 522. This blocks the work port A with the first end portions 532 of the spool 530, and opens up a flow path indicated by arrow 540 around the middle portion 534 of the spool 530 connecting the work port B to the outlet port 510.

FIG. 5B illustrates a powered state when the B-side of the open-center valve 500 is powered. In this state, the spool 530 is pushed away from the B-side which compresses the first spring 520. This blocks the work port B with the second end portion 536 of the spool 530, and opens up a flow path indicated by arrow 542 around the middle portion 534 of the spool 530 connecting the work port A to the outlet port 510.

FIG. 5C illustrates a neutral (unpowered) state when neither the A nor B-sides of the open-center valve 500 are powered. In this state, the first and second springs 520, 522 bias the spool 530 to the center of the interior cavity 504 which opens up flow paths indicated by arrows 546 and 548 around the middle portion 534 of the spool 530 connecting both of the work ports A and B, respectively, to the outlet port 510.

The invention above has been described largely around a hydrostatic drive system. However, this type of flushing system could be applied to any closed loop hydraulic application. This could include, for example, hydrostatic fan drive systems or closed loop hydraulic conveyer systems.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

I claim:

1. A 3-way open center flushing valve for use in a hydraulic system including a hydraulic circuit and a fluid flushing system, the 3-way open center flushing valve comprising:
   a spool in the interior of the 3-way flushing valve, the spool being movable between a plurality of spool positions;
   a first work port hydraulically coupling the 3-way flushing valve to a first side of the hydraulic circuit;
   a second work port hydraulically coupling the 3-way flushing valve to a second side of the hydraulic circuit;
   an outlet port hydraulically coupling the 3-way flushing valve to the fluid flushing system; and
   wherein when the spool is in a first spool position of the plurality of spool positions, the spool allows flow between the second work port and the outlet port and blocks flow to and from the first work port;
   when the spool is in a second spool position of the plurality of spool positions, the spool allows flow between the first work port and the outlet port and blocks flow to and from the second work port;
   when the spool is in a third spool position of the plurality of spool positions, the spool allows flow between the first work port and the outlet port and also allows flow between the second work port and the outlet port; and
   wherein in all spool positions the spool allows flow between at least one of the first and second work ports and the outlet port.

2. The 3-way open center flushing valve of claim 1, further comprising a first biasing mechanism pushing the spool towards the first spool position and a second biasing mechanism pushing the spool towards the second spool position, wherein the first and second biasing mechanisms place the spool in the third spool position when there are no other external forces acting on the spool.

3. The 3-way open center flushing valve of claim 2, wherein the first and second biasing mechanisms are springs.

4. The 3-way open center flushing valve of claim 3, wherein the spool comprises a first end portion, a middle portion and a second end portion, the middle portion being located between the first and second end portions; and wherein
　in the first spool position, the first end portion of the spool blocks flow to and from the first work port and the middle portion of the spool allows flow between the second work port and the outlet port;
　in the second spool position, the second end portion of the spool blocks flow to and from the second work port and the outlet port and the middle portion of the spool allows flow between the first work port and the outlet port; and
　in the third position, the middle portion of the spool allows flow between the first work port, the second work port and the outlet port.

5. The 3-way open center flushing valve of claim 4, wherein the first and second end portions of the spool have a greater diameter than the middle portion of the spool.

6. The 3-way open center flushing valve of claim 4, further comprising an interior cavity, the spool being located in the interior cavity, the first and second work ports and the outlet port being connected to the interior cavity;
　wherein the length of the middle portion of the spool is greater than the distance between the connections of the first and second work ports to the interior cavity.

7. The 3-way open center flushing valve of claim 6, wherein the interior cavity has a first cavity diameter where the first work port connects to the interior cavity and a second cavity diameter where second work port connects to the interior cavity; and
　the first end portion of the spool has a first spool diameter and the second end portion of the spool has a second spool diameter; the first spool diameter being substantially equal to the first cavity diameter and the second spool diameter being substantially equal to the second cavity diameter.

8. The 3-way open center flushing valve of claim 7, wherein the first and second end portions of the spool have a greater diameter than the middle portion of the spool.

9. The 3-way open center flushing valve of claim 8, wherein the interior cavity has a substantially uniform diameter, the first cavity diameter being substantially equal to the second cavity diameter.

10. An open center flushing valve for use in a hydraulic system including a hydraulic circuit and a fluid flushing system, the open center flushing valve comprising:
　a first work port that hydraulically couples the flushing valve to a first side of the hydraulic circuit;
　a second work port that hydraulically couples the flushing valve to a second side of the hydraulic circuit;
　an outlet port that hydraulically couples the flushing valve to the fluid flushing system; and
　a plurality of positions, each of the plurality of positions having a fluid exhaust flow path through the flushing valve; the plurality of positions including at least a first position that blocks flow to and from the first work port and allows flow between the second work port and the outlet port, and a second position that blocks flow to and from the second work port and allows flow between the first work port and the outlet port;
　wherein when the flushing valve is in the hydraulic system, any particular position of the plurality of positions of the flushing valve couples the hydraulic circuit to the fluid flushing system through the fluid exhaust flow path for that particular position;
　wherein the plurality of positions include an unpowered position and at least one powered position; the flushing valve remaining in the unpowered position except when the hydraulic circuit pressurizes the flushing valve which shifts the flushing valve into one of the at least one powered position; and
　wherein when the first side of the hydraulic circuit is pressurized relative to the second side of the hydraulic circuit, the flushing valve shifts to the first position which is one of the at least one powered position where a first fluid exhaust flow path through the flushing valve couples the second side of the hydraulic circuit to the fluid flushing system and flow to and from the first side of the hydraulic circuit through the flushing valve is blocked;
　when the second side of the hydraulic circuit is pressurized relative to the first side of the hydraulic circuit, the flushing valve shifts to the second position which is one of the at least one powered position where a second fluid exhaust flow path through the flushing valve couples the first side of the hydraulic circuit to the fluid flushing system and flow to and from the second side of the hydraulic circuit through the flushing valve is blocked; and
　when neither the first or second sides of the hydraulic circuit are pressurized relative to one another, the flushing valve remains in the unpowered position where a third fluid exhaust flow path through the flushing valve couples both the first and second sides of the hydraulic circuit to the fluid flushing system.

11. The open center flushing valve of claim 10, wherein
　in any powered position, only one of the first and second sides of the hydraulic circuit is coupled to the fluid flushing system through the flushing valve; and
　in the unpowered position, both of the first and second sides of the hydraulic circuit are coupled to the fluid flushing system through the flushing valve.

12. The open center flushing valve of claim 11, wherein in any powered position, the lower pressure side of the hydraulic circuit is coupled to the fluid flushing system through the flushing valve.

13. A hydraulic system flushing method comprising:
　coupling a hydraulic circuit to a fluid flushing system through an open center flushing valve having a plurality of positions, the flushing valve including a first work port, a second work port and an outlet port;
　selectively pressurizing the flushing valve using pressure from the hydraulic circuit to shift the flushing valve between the plurality of positions;
　in all positions of the flushing valve, fluidly coupling the hydraulic circuit to the fluid flushing system via a fluid exhaust flow path through the flushing valve; and
　in at least one of the plurality of positions of the flushing valve, blocking flow to and from one of the first and second work ports through the flushing valve.

14. The hydraulic system flushing method of claim 13, the method further comprising:

using a biasing mechanism to keep the flushing valve in a neutral position; and shifting the flushing valve out of the neutral position when the hydraulic circuit pressurizes the flushing valve to overcome the biasing mechanism.

15. The hydraulic system flushing method of claim 14, the method further comprising:

when the flushing valve is in one of the plurality of positions except not in the neutral position, coupling only one of the first and second work ports to the fluid flushing system through the flushing valve, and blocking flow through the flushing valve to and from the other of the first and second work ports; and when the flushing valve is in the neutral position, coupling both of the first and second work ports to the fluid flushing system through the flushing valve.

16. The hydraulic system flushing method of claim 14, wherein a first side of the hydraulic circuit is coupled to the first work port and a second side of the hydraulic circuit is coupled to the second work port; and the method further comprising:

when the first side of the hydraulic circuit is pressurized relative to the second side of the hydraulic circuit, shifting the flushing valve to a first position with a first fluid exhaust flow path through the flushing valve coupling only one of the first and second sides of the hydraulic circuit to the fluid flushing system;

when the second side of the hydraulic circuit is pressurized relative to the first side of the hydraulic circuit, shifting the flushing valve to a second position with a second fluid exhaust flow path through the flushing valve coupling only the other of the first and second sides of the hydraulic circuit to the fluid flushing system; and when neither the first or second sides of the hydraulic circuit are pressurized relative to one another, maintaining the flushing valve in the neutral position with a third fluid exhaust flow path through the flushing valve coupling the hydraulic circuit to the fluid flushing system.

17. The hydraulic system flushing method of claim 16, further comprising:

in the first position, coupling the second side of the hydraulic circuit to the fluid flushing system via the first flow path and blocking flow to and from the first side of the hydraulic circuit through the flushing circuit;

in the second position, coupling the first side of the hydraulic circuit to the fluid flushing system via the second flow path and blocking flow to and from the second side of the hydraulic circuit through the flushing circuit; and in the neutral position, coupling both the first and second sides of the hydraulic circuit to the fluid flushing system via the third flow path.

\* \* \* \* \*